United States Patent
Frigo et al.

(10) Patent No.: US 6,935,153 B2
(45) Date of Patent: Aug. 30, 2005

(54) METHOD AND APPARATUS FOR FLARING A TUBE

(75) Inventors: Gary Frigo, Frankfort, IL (US); Bounthavy Thavisouk, Tinley Park, IL (US); John McCarthy, Tinley Park, IL (US)

(73) Assignee: Andrew Corporation, Orland Park, IL (US)

( * ) Notice: Subject to any disclaimer, the term of this patent is extended or adjusted under 35 U.S.C. 154(b) by 104 days.

(21) Appl. No.: 10/249,281

(22) Filed: Mar. 27, 2003

(65) Prior Publication Data

US 2004/0187543 A1 Sep. 30, 2004

(51) Int. Cl.$^7$ .............................................. B21D 41/02
(52) U.S. Cl. ........................ 72/316; 72/370.11; 72/479
(58) Field of Search ........................... 72/316, 370.11, 72/370.03, 479

(56) References Cited

U.S. PATENT DOCUMENTS

| | | | |
|---|---|---|---|
| 1,505,409 A | * 8/1924 | Mueller et al. ................ | 72/318 |
| 1,966,053 A | * 7/1934 | Squires ....................... | 72/342.1 |
| 1,986,025 A | 1/1935 | Stecher | |
| 2,438,292 A | * 3/1948 | Linker et al. ............... | 72/465.1 |
| 3,833,984 A | * 9/1974 | Dietzel ..................... | 29/890.15 |
| 4,590,785 A | 5/1986 | Morris | |
| 4,779,441 A | * 10/1988 | Pringle ........................ | 72/316 |
| 6,062,060 A | 5/2000 | Nguyen | |
| 6,257,110 B1 | * 7/2001 | Ricci et al. ................... | 82/113 |

* cited by examiner

*Primary Examiner*—Daniel C. Crane
(74) *Attorney, Agent, or Firm*—Babcock IP, LLC

(57) ABSTRACT

A tool for forming flares in, for example, corrugated elliptical tubing. The tool may have a retaining portion having a longitudinal axis located between an impact surface and a die head. The die head is coupled to the retaining portion on a first side, and on a second side the die head has a guide plug extending from an inner area of a flare surface normal to the longitudinal axis; and a bottoming surface extending from a periphery of the flare surface. The bottoming surface is oriented at an angle to the flare surface. A saw guide may be used to obtain an appropriate extension of the tube from a stop which the flare is formed against.

18 Claims, 3 Drawing Sheets

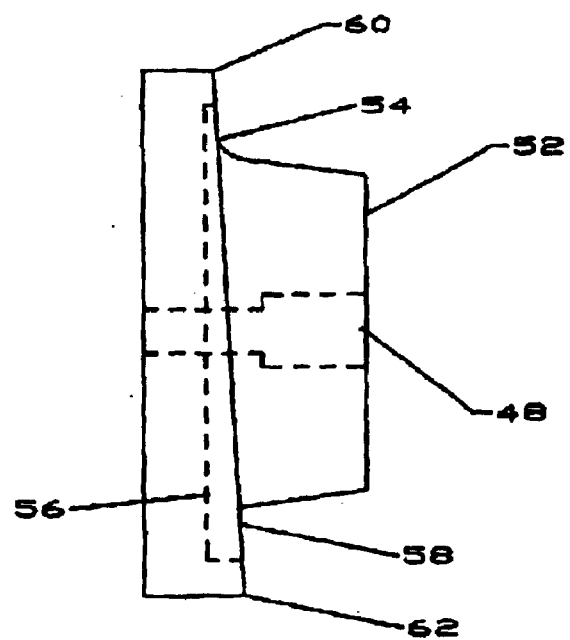
Figure 4
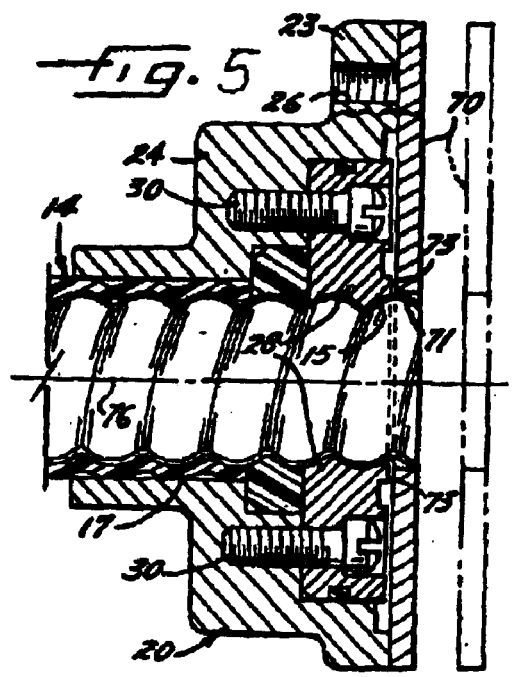

METHOD AND APPARATUS FOR FLARING A TUBE

BACKGROUND OF INVENTION

1. Field of the Invention

This invention relates to the formation of an external flare around the end of a metal tube. More particularly, the invention is concerned with flaring the end of a tube of substantially elliptical cross-section having helical corrugations along its length.

2. Description of Related Art

Elliptical tubes having helical corrugations are widely used as waveguides in the RF/microwave industry. When the elliptical tube is used as a waveguide, the end may be flared to, for example, squarely abut a waveguide connector or splice in order to establish electrical contact between the waveguide and the connector or splice. To enable good electrical contact between the waveguide and the connector or splice, it is desirable for the flare to be free of cracks and of substantially uniform thickness.

Prior screw press and or hammer type flare tools are typically intended for use with tubular tubing, for example electrical conduit, where they operate on a symmetrical end surface. When these flare tools are used with elliptical cross-section tubing having helical corrugations, the tubing end must be repeatedly worked and or hammered, making it difficult to prepare an acceptable flare without a considerable time investment by a skilled metalworker. The presence of helical corrugations on the tube further complicates formation of an acceptable flare.

Previously available flare tools designed specifically for forming flares in elliptical tubing have been relatively expensive and require separate time consuming operations with a plurality of tools to form an acceptable flare. U.S. Pat. No. 4,590,785, by John P. Morris, assigned to Andrew Corporation as is the present invention, describes a flare tool set for elliptical tubing comprising a pair of screw press type flaring tools; one dimensioned for the major axis, the longer dimension of the ellipse, and another dimensioned for the minor axis, the shorter dimension of the ellipse. Each of the tools must be attached and applied in turn to form a single flare.

Competition within the waveguide industry has focused attention on equipment and personnel costs, as well as time requirements for installation and maintenance of waveguide systems.

Therefore, it is an object of the invention to provide an apparatus that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 4 is a side view of the flare die, along the major axis, showing hidden lines.

FIG. 5 is a cross-sectional view somewhat similar to FIG. 2 and shows a saw guide which is used to enable the waveguide to be cut to the proper length prior to the flare being formed on the waveguide.

DETAILED DESCRIPTION

Figure 1:
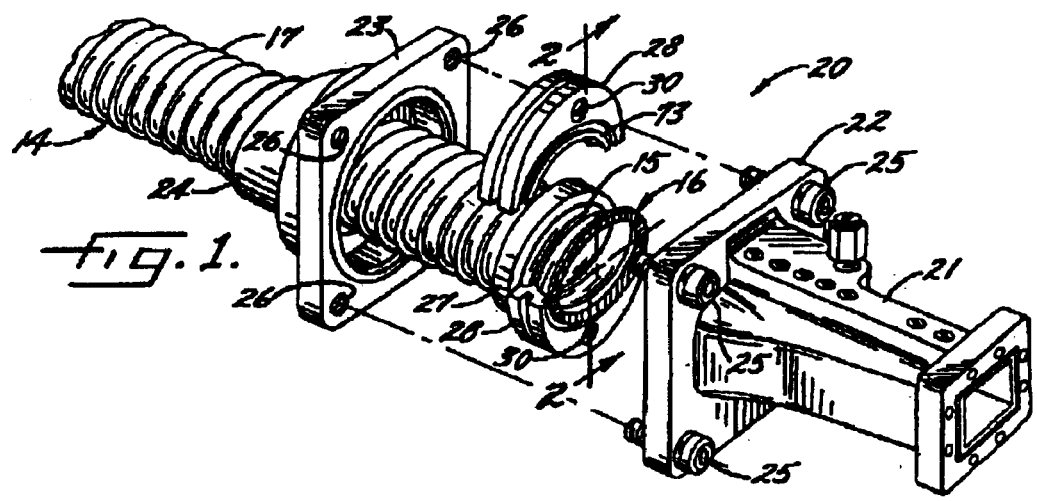
FIG. 1 is an exploded perspective view showing a typical elliptical waveguide with a flared end and showing a typical waveguide connector adapted to be coupled to the waveguide.

For purposes of illustration, a typical use of the present invention, forming connections in a waveguide system, is shown in FIG. 1. The waveguide 14 is of the type used, for example, to carry a signal in a microwave antenna feeder system. The waveguide 14 comprises a corrugated tube 15, for example made of copper or other conductive metal, having an elliptical cross-section. A sheath 17 of insulating material encapsulates the length of the tube. The sheath 17 is removed where electrical connection to the waveguide 14 is desired. The end of the corrugated tube 15 is formed with an outwardly extending end flare 16 through application of the present invention.

Figure 2:
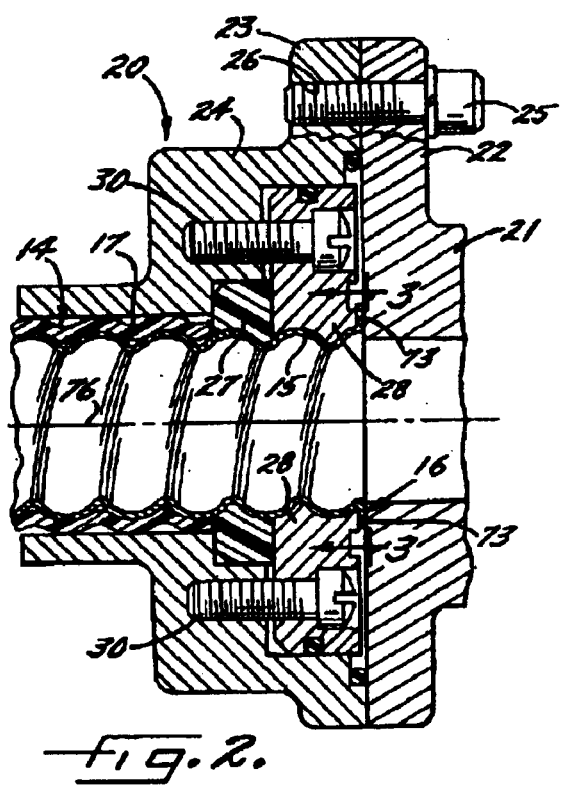
FIG. 2 is an enlarged fragmentary cross-section taken substantially along the line 2—2 of FIG. 1.

A waveguide connector 20 is coupled to the end portion of the tube 15 to couple the waveguide 14 to, for example, an antenna feed horn or the like. In this instance, the waveguide connector 20 has an elliptical to rectangular transition body 21 formed with a mounting flange 22 adapted to be fastened to the flange 23 of a compression ring 24, the two flanges being connected, in this example, by four screws 25 threaded into holes 26 in the flange 23. As shown in FIG. 2, the compression ring 24 is telescoped over the end portion of the waveguide 14 and is sealed to the tube 15 by a gasket 27 which may have an internal surface that mates with the helical corrugations of the waveguide 14. A split flare ring formed by two separate half-moon shaped pieces 28 is telescoped over the tube 15 and into the compression ring 24 and is sandwiched tightly between the flare 16 and the gasket 27. Two screws 30 fasten the pieces 28 of the split flare ring tightly to the compression ring 24. The inside surfaces of the split flare ring pieces 28 are grooved so as to be complementary with the external corrugations of the tube 15 and thus the compression ring and the split flare ring pieces 28 are held against moving axially along the tube once the screws 30 are tightened. When the screws 25 are tightened, the transition body 21 and the split ring pieces 28 are clamped in tight electrical contact with opposite sides of the end flare 16 as shown in FIG. 2.

Figure 3A:
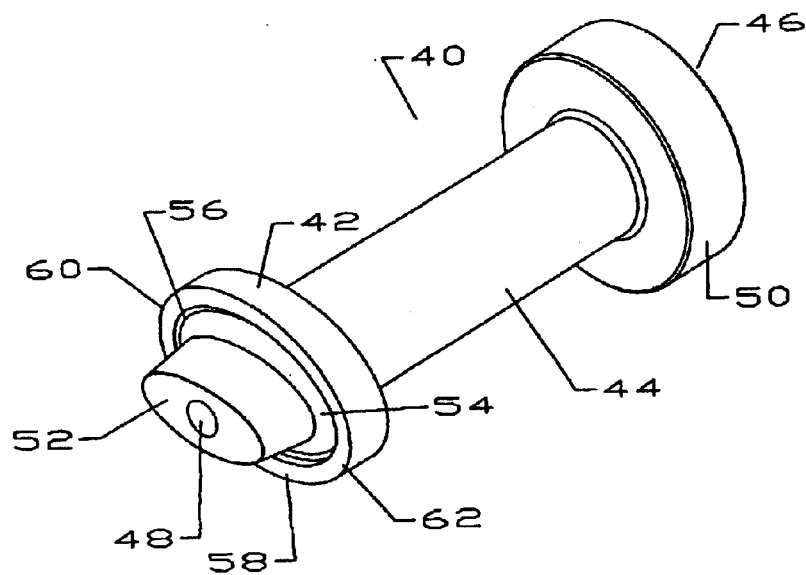
FIG. 3A is an isometric view of a flare tool according to a first embodiment of the invention.
Figure 3B:
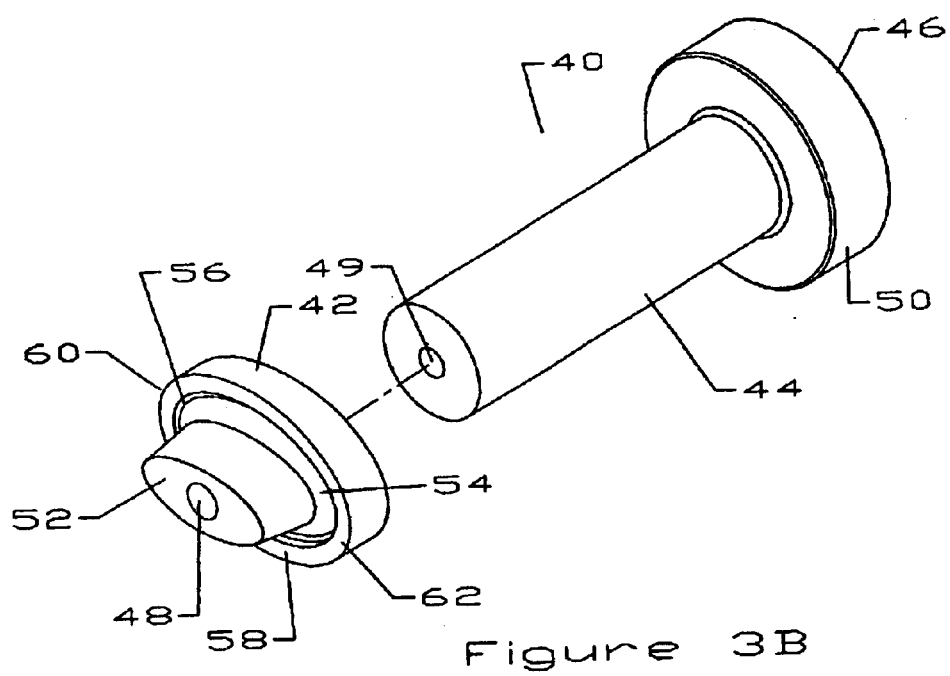
FIG. 3B is an isometric view of a flare tool according to a first embodiment of the invention, showing a detached die head.

In accordance with the present invention, the flare 16 on the end of the elliptical tube 15 may be formed by a flare tool 40 as shown in FIGS. 3A and 3B. The flare tool has a die head 42, a retaining portion 44 and an impact surface 46. Different die heads 42 may be adapted to specific waveguides 14 having, for example, different dimensions and or corrugation configurations. The desired die head 42 may be formed integrally with the retaining portion 44 and impact surface 46 or securely coupled to the retaining portion 44 via, for example, a screw threaded into a hole 48. The retaining portion is dimensioned, for example, to be securely grasped by a typical user's hand. The impact surface 46 may include a guard 50 having an increased radius relative to the retaining portion 44, useful for protecting the user's hand while a hammer or other impact device is struck upon the impact surface 46.

The die head 42 has a guide plug 52 dimensioned to initially locate the flare tool within an open end of the tube 15. At a base of the guide plug 52, a flaring radius 54 transitions to a flare surface 56 that is normal to a longitudinal axis of the flare tool 40. Along the periphery of the flare surface 56 is a bottoming surface 58. As shown in FIG. 4, the bottoming surface 58 is arranged at an angle with respect to the flare surface 56. The angle of the bottoming surface 58 creates a depth differential between the bottoming surface 58 and the flare surface 56, from a minimum depth at a first side 60 to a maximum depth at a second side 62.

A flaring operation is initiated by attaching the compression ring 24 and the split flare ring pieces 28 securely to the tube 15 with a length of the tube projecting forwardly beyond the split flare ring pieces 28. A plate-like saw guide 70, as shown in FIG. 5, with a central hole 71 for receiving the tube 15 may then be abutted tightly against the forward side of the flange 23 of the compression ring 24 with the tube 15 projecting at least a short distance through the hole 71.

The forward face of the guide 70 thus forms a guide surface along which a saw may be traversed to cut off the tube 15 and to leave an accurately determined length of tube 15 projecting forwardly beyond a forward locating face 73 on the forward side of each split flare ring piece 28. The locating faces 73 are spaced a short distance rearwardly from the forward face of the flange 23 of the compression ring 24. The forwardly projecting length of tube 15 ultimately becomes the flare 16.

From the tube 15 corrugation geometry, the corrugation(s) at the end of the forwardly projecting length of the tube 15 will be at a known location, i.e. an outwardly projecting corrugation will be at one side and an inwardly projecting corrugation will be at an opposite side. Due to a corrugation keying function of the complementary grooves on the split flare ring pieces 28, the selected width of the guide 70 and the specific dimensions of the connector body 20; the location of both the inwardly and outwardly curved corrugations will be known with respect to, for example, the minor and major axes of the elliptical cross section at the end of the forwardly projecting length of the tube 15. In the example shown in FIGS. 1, 2 and 5, the inwardly and outwardly projecting corrugations are configured to be proximate either end of the major axis. The angled bottoming surface 58 is therefore configured to locate the first side 60 and second side 62 at either end of the major axis. In other embodiments, the die head 42 may be adapted so that the angled bottoming surface 58 aligns with respective locations of the inwardly and outwardly curved corrugations as they will appear on the end of the tube 15 to be flared.

The angle of the bottoming surface 58 is selected to fall within a range having two constraints. First, the angle is large enough to engage and direct the inwardly projecting corrugation outwards, rather than collapsing and or folding it inward. Second, the angle of the bottoming surface 58 is limited so that, when the die head 42 is bottomed against a completed flare, the guide plug 52 is not driven against the internal walls of the waveguide 14 causing a deformation thereof. To minimize this aspect, the guide plug 52 may be provided with an outer edge taper which is large enough to prevent damage to the interior surface of the waveguide 14 when the bottoming surface 58 is flush with the compression ring 24, but not so large that the guide plug 52 looses its keying function. The bottoming surface 58 angle may be approximately one half of the corrugation pitch angle. The corrugation pitch angle being the angle of the helical corrugations with respect to a reference plane normal to the longitudinal axis of the waveguide 14.

After the tube 15 has been cut to a desired length, the guide 70 is removed and the flare tool 40 applied to form the flare 16. The flare tool is oriented, initially axially aligned with the waveguide 14, so that the first side 60 is aligned with a side of the forwardly projecting length of tube 15 having an inwardly projecting corrugation and loosely inserted into the open end of the tube 15, guided by the guide plug 52. With the flare tool 40 held in place via a hand on the retaining portion 44, a user may use a hammer or other impact tool to impact the impact surface 46 and thereby drive the forwardly projecting length of the tube 15 into the flare 16, by pressing it between the locating faces 73 and the flare surface 56 until the bottoming surface 58 bottoms against the split flare ring pieces 28.

In a kit form, the invention may be supplied with the guide 70 and flare tool 40. For use with a plurality of differently dimensioned and or corrugated tubes 15, a kit may comprise several different die heads 42 and or guides 70 as necessary. The die head 42 and retaining portion 44 may be configured with a quick release feature, allowing the different die heads 42 to be securely screwed and or snap fit together with the retaining portion 44, similar to ratchet wrench socket sets.

a new and improved method and apparatus for forming a flare 16 on the end of an elliptical tube 15, without requiring repeated working of the metal. The flare 16 that is formed is of substantially uniform thickness so as to enable the flare 16 to make good electrical contact with the waveguide connector 20. As described, the invention provides an inexpensive, portable and reliable means for forming a high quality flare 16 on an elliptical tube 15, with reduced time and user training requirements.

| Table of Parts | |
|---|---|
| 14 | waveguide |
| 15 | tube |
| 17 | sheath |
| 20 | waveguide connector |
| 21 | transition body |
| 22 | mounting flange |
| 23 | flange |
| 24 | compression ring |
| 25 | screw |
| 26 | hole |
| 27 | gasket |
| 28 | split flare ring piece |
| 30 | split flare ring screw |
| 40 | flare tool |
| 42 | die head |
| 44 | retaining portion |
| 46 | impact surface |
| 48 | retaining hole |
| 50 | guard |
| 52 | guide plug |
| 54 | flaring radius |
| 56 | flare surface |
| 58 | bottoming surface |
| 60 | first side |
| 62 | second side |
| 70 | saw guide |
| 71 | saw guide hole |
| 73 | forward locating face |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail.

Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A flare tool, comprising:
   a retaining portion having a longitudinal axis located between an impact surface and
   a die head;
   the die head coupled to the retaining portion on a first side, and on a second side having
   a guide plug extending from an inner area of
   a planer flare surface normal to the longitudinal axis; and
   a planer bottoming surface extending from a periphery of the flare surface;
   the bottoming surface oriented at an angle to the flare surface.

2. The apparatus of claim 1, wherein the guide plug and the bottoming surface are elliptical.

3. The apparatus of claim 2, wherein the bottoming surface has a minimum extension from the flare surface proximate a first side of a major axis of the bottoming surface.

4. The apparatus of claim 1, wherein the guide plug and the bottoming surface are circular.

5. The apparatus of claim 1, wherein the retaining portion is cylindrical.

6. The apparatus of claim 1, wherein the retaining portion is dimensioned for grasping by a human hand.

7. The apparatus of claim 1, further including a guard section having a radius larger than the retaining portion located between the retaining portion and the impact surface.

8. The apparatus of claim 1, wherein the die head and the retaining portion are formed in a single piece.

9. The apparatus of claim 1, wherein the die head is removably attached to the retaining portion.

10. The apparatus of claim 8, wherein the die head is removably attached to the retaining portion by a screw.

11. A flare tool die, comprising:
    a guide plug extending from an inner area of a planer flare surface normal to a longitudinal axis of the die; and
    a planer bottoming surface extending from a periphery of the flare surface;
    the bottoming surface oriented at an angle to the flare surface.

12. The apparatus of claim 11, wherein the guide plug and the bottoming surface are elliptical.

13. The apparatus of claim 12, wherein the bottoming surface has a minimum extension from the flare surface proximate a first side of a major axis of the bottoming surface.

14. The apparatus of claim 11, wherein the guide plug and the bottoming surface are circular.

15. A corrugated tube flaring tool kit, comprising:
    a saw guide; and
    a flare tool, comprising;
    a retaining portion having a longitudinal axis located between an impact surface and a die head;
    the die head coupled to the retaining portion on a first side, and on a second side having a guide plug extending from an inner area of a planer flare surface normal to the longitudinal axis; and a planer bottoming surface extending from a periphery of the flare surface; and the bottoming surface oriented at an angle to the flare surface.

16. The kit of claim 15, wherein the saw guide is a planar surface with a hole dimensioned to accept the tube.

17. The kit of claim 15, wherein the die head is removably attached to the retaining portion; and the kit includes a plurality of different die heads.

18. The kit of claim 17, further including a plurality of different saw guides.

* * * * *

UNITED STATES PATENT AND TRADEMARK OFFICE
CERTIFICATE OF CORRECTION

PATENT NO.   : 6,935,153 B2
DATED        : August 30, 2005
INVENTOR(S)  : Gary Frigo et al.

It is certified that error appears in the above-identified patent and that said Letters Patent is hereby corrected as shown below:

Column 5,
Lines 20 and 21, each occurrence of "planer" should be -- planar --.

Column 6,
Lines 6, 8, 28 and 29, each occurrence of "planer" should be -- planar --.

Signed and Sealed this

Eleventh Day of October, 2005

JON W. DUDAS
*Director of the United States Patent and Trademark Office*